(12) United States Patent
Cook

(10) Patent No.: US 8,427,744 B2
(45) Date of Patent: Apr. 23, 2013

(54) ALL-REFLECTIVE RELAYED FOCAL TELESCOPE DERIVED FROM THE FIRST TWO MIRRORS OF AN AFOCAL THREE-MIRROR ANASTIGMAT

(75) Inventor: Lacy G. Cook, El Segundo, CA (US)

(73) Assignee: Raytheon Company, Waltham, MA (US)

( * ) Notice: Subject to any disclaimer, the term of this patent is extended or adjusted under 35 U.S.C. 154(b) by 757 days.

(21) Appl. No.: 12/577,279

(22) Filed: Oct. 12, 2009

(65) Prior Publication Data

US 2011/0085235 A1 Apr. 14, 2011

(51) Int. Cl.
*G02B 23/00* (2006.01)
*G02B 17/00* (2006.01)
*G02B 21/00* (2006.01)
*G02B 5/10* (2006.01)

(52) U.S. Cl.
USPC ............................. 359/399; 359/366; 359/859

(58) Field of Classification Search .................. 359/366, 359/399, 859
See application file for complete search history.

(56) References Cited

U.S. PATENT DOCUMENTS

| 3,524,698 A | * | 8/1970 | Brueggemann | ............... 359/729 |
| 3,674,334 A | | 7/1972 | Offner | |
| 4,101,195 A | | 7/1978 | Korsch | |
| 4,804,258 A | * | 2/1989 | Kebo | ............... 359/366 |
| 5,078,502 A | | 1/1992 | Cook | |
| 5,144,476 A | * | 9/1992 | Kebo | ............... 359/366 |
| 5,227,923 A | * | 7/1993 | Kebo | ............... 359/859 |
| 5,331,470 A | | 7/1994 | Cook | |
| 5,550,672 A | | 8/1996 | Cook | |
| 6,767,103 B2 | | 7/2004 | Cook | |
| 6,970,286 B1 | | 11/2005 | Kunick | |
| 8,123,371 B2 | | 2/2012 | Cook | |

FOREIGN PATENT DOCUMENTS

WO  95/34840 A1  12/1995

OTHER PUBLICATIONS

European Search Report dated Dec. 20, 2010 of EPA No. 10172458 (8 pages).

* cited by examiner

*Primary Examiner* — Alessandro Amari
(74) *Attorney, Agent, or Firm* — Lando & Anastasi, LLP

(57) ABSTRACT

An optical system includes a primary mirror of a positive-powered concave substantially paraboloidal configuration configured to reflect light incident thereupon; a secondary mirror of a negative-powered convex hyperboloidal configuration facing the primary mirror configured to receive the light reflected from the primary mirror and redirect the light reflected from the primary mirror; a positive-powered tertiary mirror configured to substantially reimage and reflect divergent light rays incident from the secondary mirror; and a powered quaternary mirror configured to receive the reimaged light rays from the tertiary mirror, and to relay the received reimaged light rays to a focal point.

17 Claims, 6 Drawing Sheets

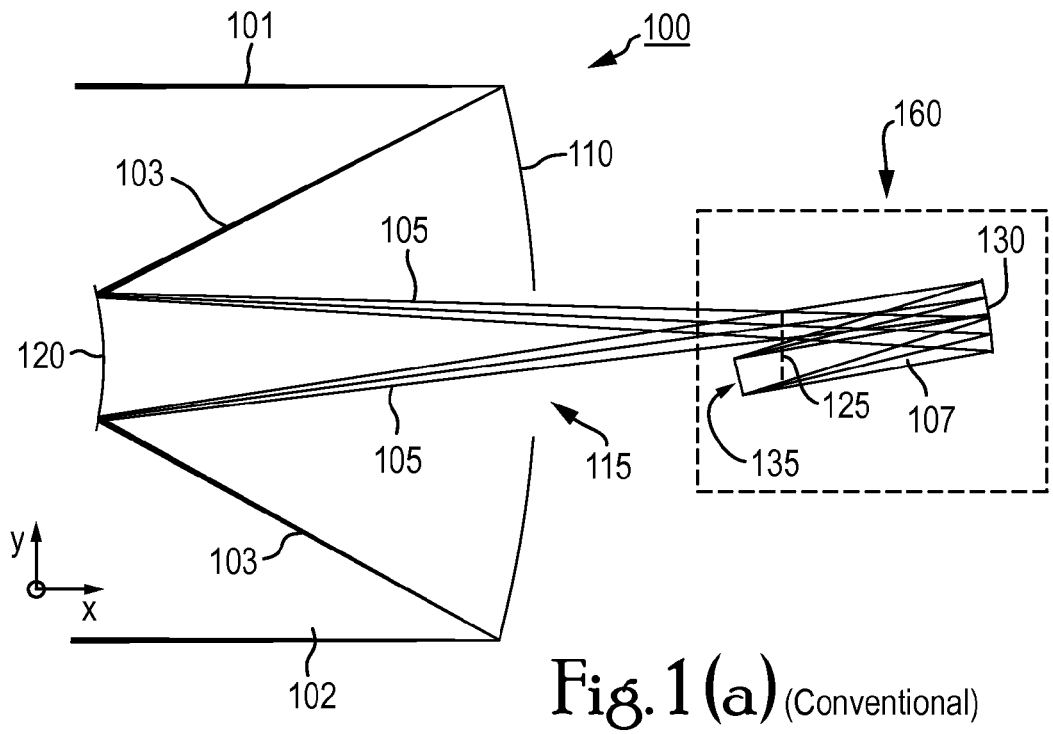
Fig. 1(a) (Conventional)
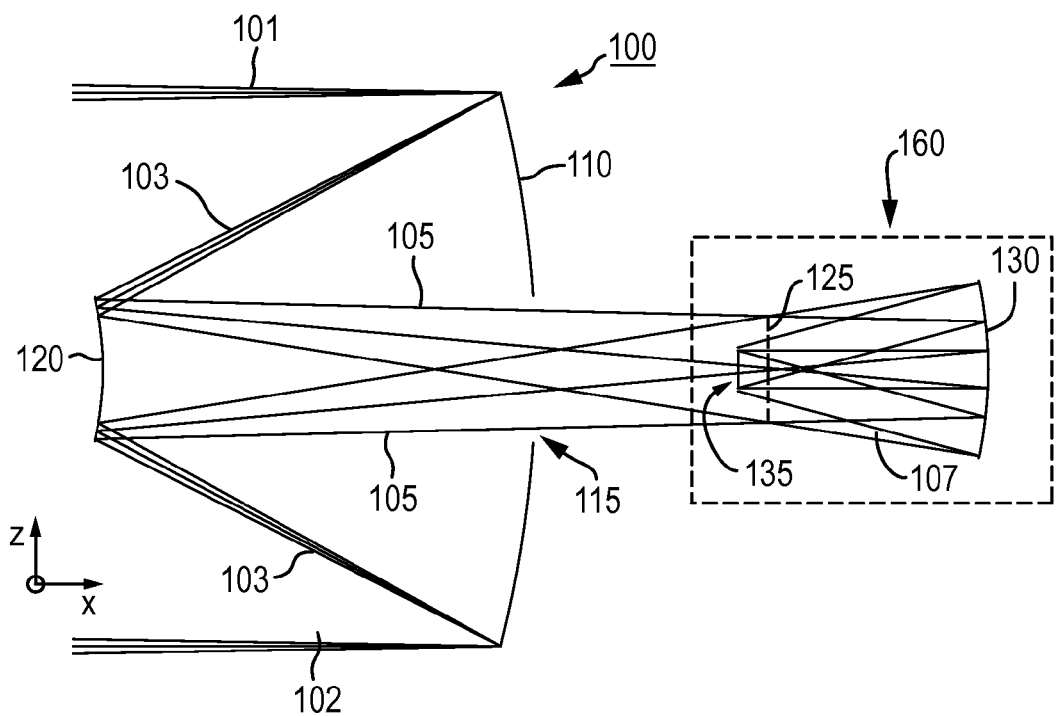
Fig. 1(b) (Conventional)

AFOCAL TMA AT 15X MAGNIFICATION AND 2 DEG FOV

| SURFACE | FUNCTION | RADIUS | THICKNESS | MATERIAL | CC | Ad | Ae | Af | Ag | Ydecenter | Ytilt,deg |
|---|---|---|---|---|---|---|---|---|---|---|---|
| 110 | PRIMARY | -60.000 | -23.3788 | REFL | -1.00135 | | | | | | |
| 120 | SECONDARY | -16.1421 | 36.8590 | REFL | -2.07887 | | | | | 0.1368 | 1.1847 |
| 125 | INTER IMAGE | INF | 11.0726 | AIR | | | | | | | |
| 130 | TERTIARY | -22.2784 | -14.3389 | REFL | -1.03302 | -2.488E-07 | -1.966E-08 | 4.131E-10 | NA | 2.3897 | 7.5971 |
| 135 | EXIT PUPIL | INF | NA | AIR | | | | | | | |

ENTRANCE PUPIL IS SURFACE 1; DIAMETER IS 30
FOV OFFSET IS -0.43866 deg; ELEVATION PLANE
FOV IS 2 deg TOTAL LENGTH, AZIMUTH PLANE
EXIT PUPIL DIAMETER IS 2.016
AFOCAL MAGNIFICATION IS 14.96X Ad, Ae, Af, ARE ASPHERIC CONSTANTS
CC IS A CONIC CONSTANT

*FIG. 4*

DERIVED FOCAL AT F/12 AND 2 DEG FOV

| SURFACE | FUNCTION | RADIUS | THICKNESS | MATERIAL | CC | Ad | Ae | Af | Ag | Ydecenter | Ytilt, deg |
|---|---|---|---|---|---|---|---|---|---|---|---|
| 210 | PRIMARY | -60.000 | -23.3788 | REFL | -1.00135 | | | | | | |
| 220 | SECONDARY | -16.1421 | 36.8590 | REFL | -2.07887 | | | | | 0.1368 | 1.1847 |
| 225 | INTER IMAGE | INF | 16.3003 | AIR | | | | | | | |
| 230 | TERTIARY | -22.2119 | -13.6727 | REFL | -0.16129 | 1.449E-06 | 2.578E-08 | -1.121E-09 | 1.694E-11 | 2.0937 | 4.9595 |
| 235 | PUPIL | INF | -11.3948 | AIR | | | | | | | |
| 240 | QUATERNARY | 824.85 | 9.30931 | REFL | | -7.249E-05 | 8.568E-07 | -1.555E-07 | 7.665E-09 | -1.1876 | 3.9662 |
| 270 | FINAL IMAGE | INF | NA | NA | | | | | | -2.1260 | -1.1257 |

ENTRANCE PUPIL IS SURFACE 1; DIAMETER IS 30
FOV OFFSET IS -0.3354 deg; ELEVATION PLANE
FOV IS 2 deg TOTAL LENGTH, AZIMUTH PLANE
FOCAL LENGTH IS 370
F-NUMBER IS F/12.3
FINAL IMAGE LENGTH IS 12.91; AZIMUTH PLANE
REIMAGED PUPIL DIAMETER IS 1.78

Ad, Ae, Af, Ag ARE ASPHERIC CONSTANTS
CC IS A CONIC CONSTANT

FIG. 5

DERIVED FOCAL AT F/16 AND 1.5 DEG FOV

| SURFACE | FUNCTION | RADIUS | THICKNESS | MATERIAL | CC | Ad | Ae | Af | Ag | Ydecenter | Ytilt,deg |
|---|---|---|---|---|---|---|---|---|---|---|---|
| 310 | PRIMARY | -60.000 | -23.3788 | REFL | -1.00135 | | | | | | |
| 320 | SECONDARY | -16.1421 | 36.8590 | REFL | -2.07887 | | | | | 0.1368 | 1.1847 |
| 325 | INTER IMAGE | INF | 15.3581 | AIR | | | | | | | |
| 330 | TERTIARY | -23.4195 | -14.6581 | REFL | -0.20756 | 2.031E-06 | 2.402E-08 | -9.953E-10 | 1.594E-11 | 2.2926 | 5.7953 |
| 335 | PUPIL | INF | -13.0209 | AIR | | | | | | | |
| 340 | QUATERNARY | 344.236 | 18.7114 | REFL | | -1.845E-05 | 1.284E-07 | -1.869E-08 | 8.969E-10 | -1.8128 | 4.1752 |
| 370 | FINAL IMAGE | INF | NA | NA | | | | | | -2.6790 | -0.2323 |

ENTRANCE PUPIL IS SURFACE 1; DIAMETER IS 30
FOV OFFSET IS -0.28855 deg; ELEVATION PLANE
FOV IS 1.5 deg TOTAL LENGTH, AZIMUTH PLANE
FOCAL LENGTH IS 480
F-NUMBER IS F/16.0
FINAL IMAGE LENGTH IS 12.57; AZIMUTH PLANE
REIMAGED PUPIL DIAMETER IS 1.94

Ad, Ae, Af, Ag ARE ASPHERIC CONSTANTS
CC IS A CONIC CONSTANT

ALL-REFLECTIVE RELAYED FOCAL TELESCOPE DERIVED FROM THE FIRST TWO MIRRORS OF AN AFOCAL THREE-MIRROR ANASTIGMAT

BACKGROUND

The present disclosure relates to optical systems and in particular to an all-reflective focal optical system, such as an all-reflective focal telescope that is derived from the first two mirrors of an afocal three-mirror anastigmat optical system or telescope.

An example of a conventional all-reflective focal three-mirror anastigmat telescope is illustrated by U.S. Pat. No. 4,101,195 to Korsch, entitled "Anastigmatic Three-Mirror Telescope," the entire contents of which are incorporated herein by reference. This patent discloses a focal three-mirror telescope having an ellipsoidal primary mirror, a hyperbolic secondary mirror, and an ellipsoidal tertiary mirror, with the three mirrors producing an image in a conveniently located finite plane for viewing.

An example of a conventional all-reflective afocal telescope is illustrated by U.S. Pat. No. 3,674,334 to Offner, entitled "Catoptric Anastigmatic Afocal Optical System," the entire contents of which are incorporated herein by reference. This patent discloses a catoptric anastigmatic afocal optical system comprising two concave paraboloidal reflectors of different powers for the primary and tertiary mirrors and a convex hyperboloidal secondary mirror reflector adapted to receive and recollimate radiant energy.

Focal and afocal telescopes are individually best suited for different imaging tasks. For example, certain imaging tasks such as wide area search functions are preferably done in a vehicle scanning mode using linear focal plane array (FPA) technology. A focal three-mirror anastigmat telescope may be best suited for these tasks. Also, certain other imaging tasks such as point collection for detailed interrogation and characterization are best done behind an afocal optical system, because such tasks use custom instruments with two-dimensional (2D) staring FPA's or internally scanned linear FPAs. An afocal telescope may be best suited for these tasks. Thus, depending on the imaging tasks to be performed, conventionally different telescopes may have to be used.

Table 1 illustrates exemplary data for focal and afocal three-mirror anastigmat (TMA) telescopes each having a 75 cm aperture.

| Cassegrain parameter | Focal TMA | Afocal TMA | Peak/Valley WFE, um | RMS WFE, um |
|---|---|---|---|---|
| Primary Mirror Conic (F/1.2) | −0.992 | −1.002 | 3.7 | 0.9 |
| Primary/Secondary Spacing (in) | 29.567 | 28.433 | | |
| Secondary Mirror Radius (in) | 13.776 | 16.082 | | |
| Secondary Mirror Conic | −1.715 | −1.944 | 10.4 | 2.1 |

As will be appreciated, the configuration for the primary and secondary mirrors of a focal and an afocal TMA is quite different in radii, conic departures, and spacings.

An all-reflective optical system constructed to provide both focal and afocal optical functions is desired. U.S. patent application Ser. No. 12/369,976 filed Feb. 12, 2009, incorporated herein by reference in its entirety, discloses an all-reflective afocal telescope that is derived from the first two mirrors of a focal TMA optical system, such as a focal TMA telescope.

SUMMARY

In an embodiment, an optical system comprises: a primary mirror of a positive-powered concave paraboloidal configuration configured to reflect light incident thereupon; a secondary mirror of a negative-powered convex hyperboloidal configuration facing the primary mirror configured to receive the light reflected from the primary mirror and redirect the light reflected from the primary mirror; a positive-powered tertiary mirror configured to substantially reimage and reflect divergent light rays incident from the secondary mirror; and a negative-powered quaternary mirror configured to receive the reimaged light rays from the tertiary mirror, and to relay the received reimaged light rays to a focal point.

In another embodiment, a method comprises: reflecting, using a primary mirror of a concave paraboloidal configuration, light rays incident thereon; reflecting, using a secondary mirror of a convex hyperboloidal configuration facing the primary mirror, the light rays received from the primary mirror; substantially reimaging and reflecting, using a positive-powered tertiary mirror, divergent light rays incident from the secondary mirror; and reflecting, using a powered quaternary mirror, the reimaged light rays incident from the tertiary mirror to a focal point.

In yet another embodiment, a method comprises: providing a primary mirror of a concave substantially paraboloidal configuration for reflecting light rays incident thereon; providing a secondary mirror of a convex hyperboloidal configuration for reflecting the light rays received from the primary mirror; providing a positive-powered tertiary mirror for substantially reimaging and reflecting divergent light rays incident from the secondary mirror; and providing a powered quaternary mirror for reflecting the reimaged light rays incident from the tertiary mirror to a focal point.

These and other aspects of this disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment, the structural components illustrated herein are drawn to scale. It is to be expressly understood, however, that the drawings are for the purpose of illustration and description only and are not a limitation of the invention. In addition, it should be appreciated that structural features shown or described in any one embodiment herein can be used in other embodiments as well.

BRIEF DESCRIPTION OF THE DRAWINGS

FIGS. 1(a) and (b) illustrate of a ray-trace section of a conventional all-reflective afocal optical system that is constructed to provide afocal optical functions;

FIG. 4 is one exemplary optical prescription for the conventional afocal optical system shown in FIGS. 1(a) and (b);

FIG. 5 is one exemplary optical prescription for the all-reflective optical system shown in FIGS. 2(a) and (b), in accordance with an embodiment; and FIG. 6 is one exemplary optical prescription for the all-reflective optical system shown in FIGS. 3(a) and (b), in accordance with an embodiment.

DETAILED DESCRIPTION

Figure 2A:
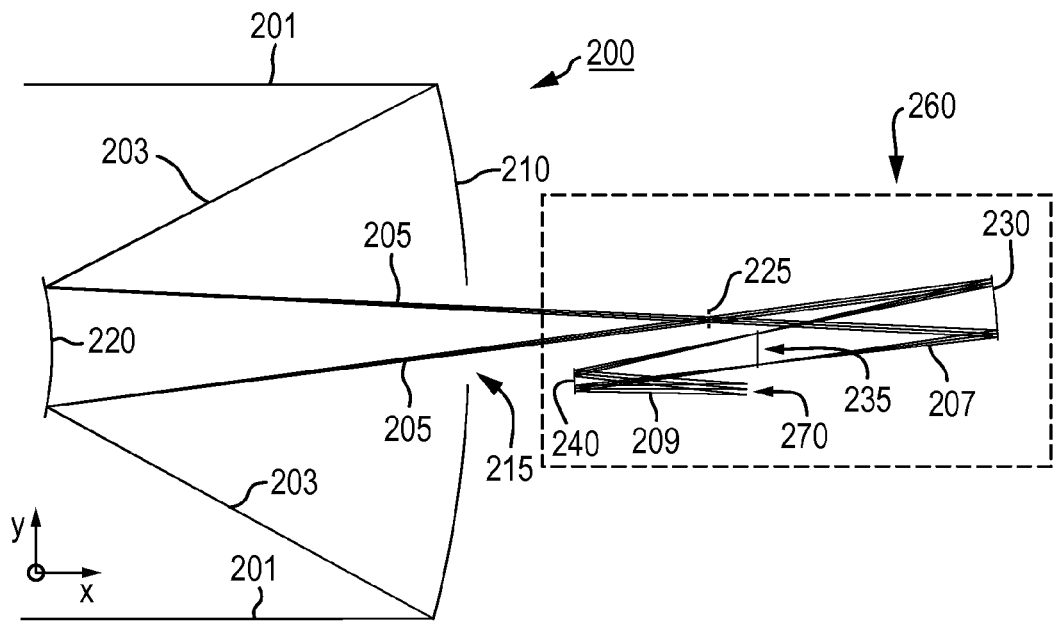
FIGS. 2(a) and (b) depict an exemplary illustration of a ray-trace section of an all-reflective optical system that is derived from the first two mirrors of the afocal three-mirror anastigmat optical system shown in FIGS. 1(a) and (b), in accordance with an embodiment.

According to an aspect of the present disclosure, an all-reflective optical system may be constructed to provide both focal and afocal optical functions while sharing at least the first two mirrors of an afocal three-mirror anastigmat (TMA) optical system.

FIGS. 1(a) and (b) depict a ray-trace section of a conventional all-reflective optical system 100 that is constructed to provide afocal optical functions. FIG. 1(a) shows a side view and FIG. 1(b) shows a top view of optical system 100.

Conventional afocal optical system 100 may in some implementations, be constructed in accordance with the teachings of U.S. Pat. No. 3,674,334 to Offner, mentioned above. Other variations of the primary mirror 110, secondary mirror 120, and tertiary mirror 130 are also possible.

The first two mirrors of optical system 100 are primary mirror 110 and secondary mirror 120. Primary mirror 110, having central opening 115, may be a positive-powered concave substantially paraboloidal mirror. In some implementations, substantially paraboloidal primary 110 may tend towards a mild hyperboloid.

Secondary mirror 120 may be a smaller and centered negative-powered convex hyperboloidal mirror. In one embodiment, the first two mirrors (i.e., primary mirror 110 and secondary mirror 120) may be arranged in a classical Cassegrain-like arrangement (i.e., having a primary concave mirror and a secondary convex mirror).

Primary mirror 110 and secondary mirror 120 have conic or aspheric departures that are optimal for use in conventional afocal three-mirror anastigmat optical systems. A focal optical system, on the other hand, conventionally requires an ellipsoidal primary mirror, not an paraboloid mirror, and a radically different base radius and conic hyperboloid secondary mirror. Further, the separation between the primary and the secondary mirror constructed for use in an afocal optical system is typically appreciably shorter than that of a focal optical system. The conic or aspheric departure is the departure from a spherical surface.

Optical system 100 may further include all-reflective eye-piece 160 that is positioned behind primary mirror 110 and secondary mirror 120 to form a high performance afocal optical system (in other words, an optical system that can provide afocal optical functions). Eye-piece 160 includes tertiary mirror 130.

Incoming light rays 101 impinge on primary mirror 110 which reflects beams 103 onto secondary mirror 120. Light rays 105 may be reflected by secondary mirror 120 onto tertiary mirror 130 of eye-piece 160. Tertiary mirror 130 substantially collimates light rays 105 and reflects collimated light rays 107 forming exit pupil 135 of eye-piece 160.

In one implementation, tertiary mirror 130 may have higher order aspheric surface departures beyond those of conic departures (e.g., paraboloid, hyperboloid, or ellipsoid). Tertiary mirror 130 may be a positive-powered aspheric mirror which has a majority of the positive power that is expected in eye-piece 160 and is configured to substantially collimate rays 105 incident thereon. In some implementations, tertiary mirror 130 having small tilts and decenters may be used in optical system 100.

The structure, parameters, and/or placement of tertiary mirror 130 in optical system 100 may be arranged to cause a flat-field condition to be achieved at a desired magnification and off-axis aberrations (notably coma and astigmatism) over a desired field-of-view to be corrected. In one implementation, a majority of the aberrations (e.g., coma, spherical, and astigmatism) may be corrected by tertiary mirror 130.

Primary mirror 110, secondary mirror 120, and tertiary mirror 130 may be designed using a computer with a ray-trace software package. Although the optical arrangement of various embodiments of this disclosure are new, an optical prescription for conventional optical system 100 in FIG. 1 may be generated using an equation which may be an industry standard, and would be known to one of ordinary skill in the art.

One such prescription for a conventional afocal optical system 100 is shown in FIG. 4. As configured, optical system 100 provides about 15× magnification and a field of view of about 1.5 degrees.

From the optical prescription in FIG. 4, one of ordinary skill in the art will recognize that primary mirror 110 and secondary mirror 120 are mirrors that are optimized for best image quality and operation of a conventional afocal three-mirror anastigmat telescope.

Primary mirror 110, secondary mirror 120, and tertiary mirror 130 may share a common optical axis without de-center and tilts.

Figure 2B:
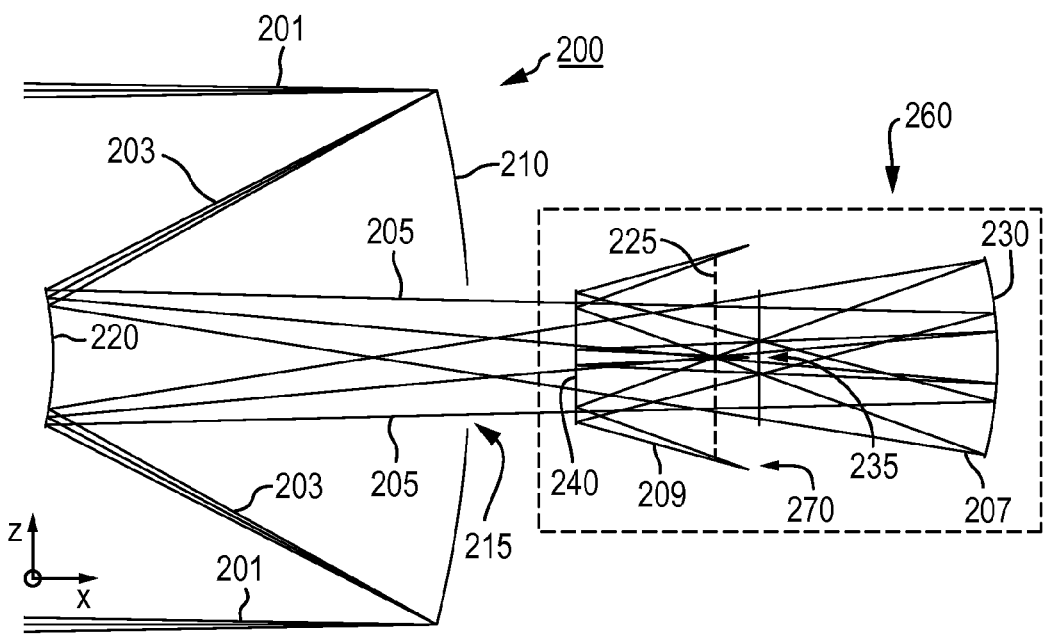

FIGS. 2(a) and (b) depict an exemplary illustration of a ray-trace section of all-reflective optical system 200 that is derived from the first two mirrors of the afocal three-mirror anastigmat optical system 100 shown in FIGS. 1(a) and (b), in accordance with an embodiment. FIG. 2(a) shows a side view and FIG. 2(b) shows a top view of optical system 200.

Optical system 200 generally includes primary mirror 210, secondary mirror 220, tertiary mirror 230 and quaternary mirror 240. Incoming light rays 201 impinge on primary mirror 210 which reflects beams 203 onto secondary mirror 220. Light rays 205 may be reflected by secondary mirror 220 through central opening 215 of primary mirror 210 onto tertiary mirror 230 of relay 260. In contrast, to eyepiece 160 (FIG. 1), optical system 200 includes relay 260 that takes an image 225 and forms another image 270. In the process, it also forms reimaged pupil 235 that is not in collimated space.

Tertiary mirror 230 receives divergent light rays 205 from intermediate image 225 by substantially reimaging light rays 205 and reflecting light rays 207 onto quaternary mirror 240. Quaternary mirror 240 receives light rays 207 from tertiary mirror 230 performs further reimaging of light rays 207 and reflects convergent rays 209 to form focal point image 270. Quaternary mirror 240 may have very little power and may be used primarily for aberration correction; it may be either positively or negatively powered.

The construction of primary mirror 210 and secondary 220 may be the same or similar to primary mirror 110 and secondary mirror of conventional afocal optical system 100. Relay 260 includes tertiary mirror 230 and quaternary mirror 240 and provides focal functions even though primary mirror 210 and secondary mirror 220 are optimal for use in an afocal three-mirror anastigmat optical system.

Both tertiary mirror 230 and quaternary mirror 240 may be high order general aspheric surface beyond those of conical surface (e.g., paraboloid, hyperboloid, or ellipsoid). Tertiary mirror 230 may be a positive-powered aspheric mirror which has a majority of the positive power that is expected in relay 260 and is configured to substantially reimage rays 205 incident thereon. In one implementation, quaternary mirror 240 may be a slightly powered near-flat aspheric mirror which has much less power than tertiary mirror 230, and is configured to further reimage light rays 205 incident thereon. And, in some implementations, tertiary mirror 230 and quaternary mirror 240 having small tilts and de-centers may be used in optical system 200. Intermediate image 225 is formed between secondary mirror 220 and tertiary mirror 230. Intermediate image 225 is essentially the "boundary" of the Cassegrain foreoptics. Reimaged pupil 235 is located between tertiary mirror 230 and quaternary mirror 240 of relay 260.

The structure, parameters, and/or placement of tertiary mirror 230 and quaternary mirror 240 in optical system 200 may be arranged to cause a flat-field condition to be achieved at a desired focal length and off-axis aberrations (notably coma and astigmatism) over a desired field-of-view (FOV) to be corrected. In one embodiment, a majority of the aberrations (e.g., coma, spherical, and astigmatism) are corrected by tertiary mirror 230, and further aberration correction is performed by quaternary mirror 240.

In one embodiment, by utilizing relay 260, as described above, optical system 200 provides focal functions even when the conic or aspheric departures of primary mirror 210 and secondary mirror 220 are optimal for use in an afocal three-mirror anastigmat optical system.

Primary mirror 210, secondary mirror 220, tertiary mirror 230, and quaternary mirror 240 may be designed using a computer with a ray-trace software package. Although the optical arrangement of various embodiments of this disclosure are new, an optical prescription for optical system 200 in FIG. 2 may be generated using an equation which may be an industry standard, and would be known to one of ordinary skill in the art.

One such optical prescription for optical system 200 is shown in FIG. 5 in accordance with an embodiment. As configured, optical system 200 has an F-number of 12 and a field of view of about 2 degrees.

From the optical prescription in FIG. 5, it will be appreciated that primary mirror 210 and secondary mirror 220 are mirrors that are optimized for an afocal three-mirror anastigmat telescope. In fact, primary mirror 210 and secondary mirror 220 may be the same configuration as primary mirror 110 and secondary mirror 120 of conventional afocal optical system 100 (FIG. 1).

In one embodiment, primary mirror 210, secondary mirror 220, tertiary mirror 230, and quaternary mirror 240 may share a common optical axis without de-center and tilts. FIG. 5 further provides one exemplary set of values for various parameters of tertiary mirror 230 and quaternary mirror 240, which as depicted in FIG. 2 are located behind primary mirror 210 and secondary mirror 220 to form a high performance image-forming or focal optical system.

Figure 3A:
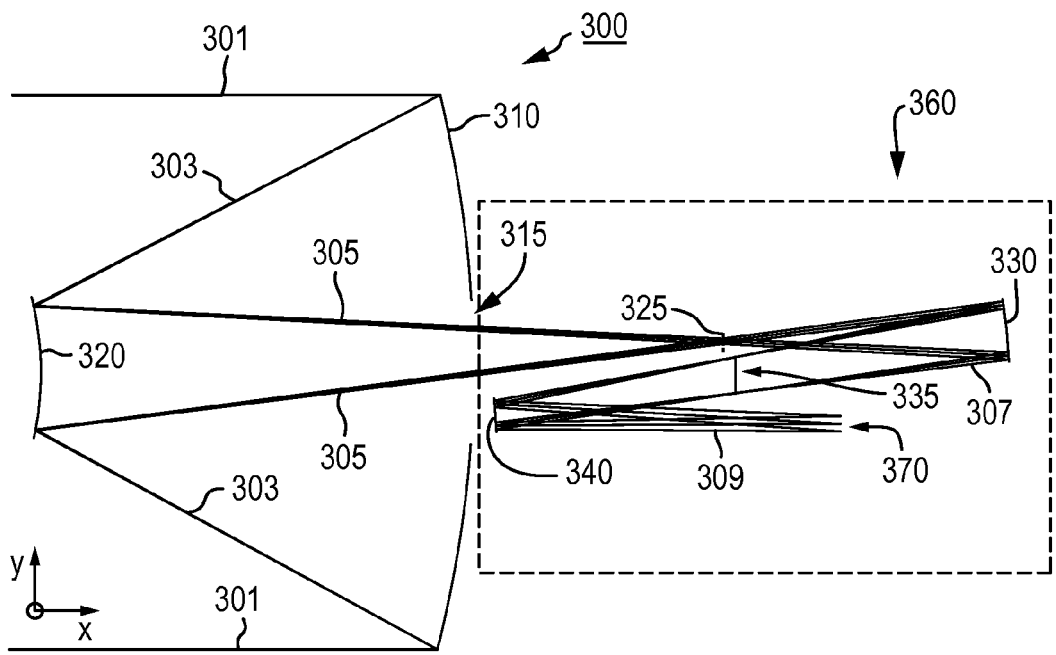
FIGS. 3(a) and (b) depict another exemplary illustration of a ray-trace section of an all-reflective optical system that is derived from the first two mirrors of the afocal three-mirror anastigmat optical system shown in FIGS. 1(a) and (b), in accordance with an embodiment.
Figure 3B:
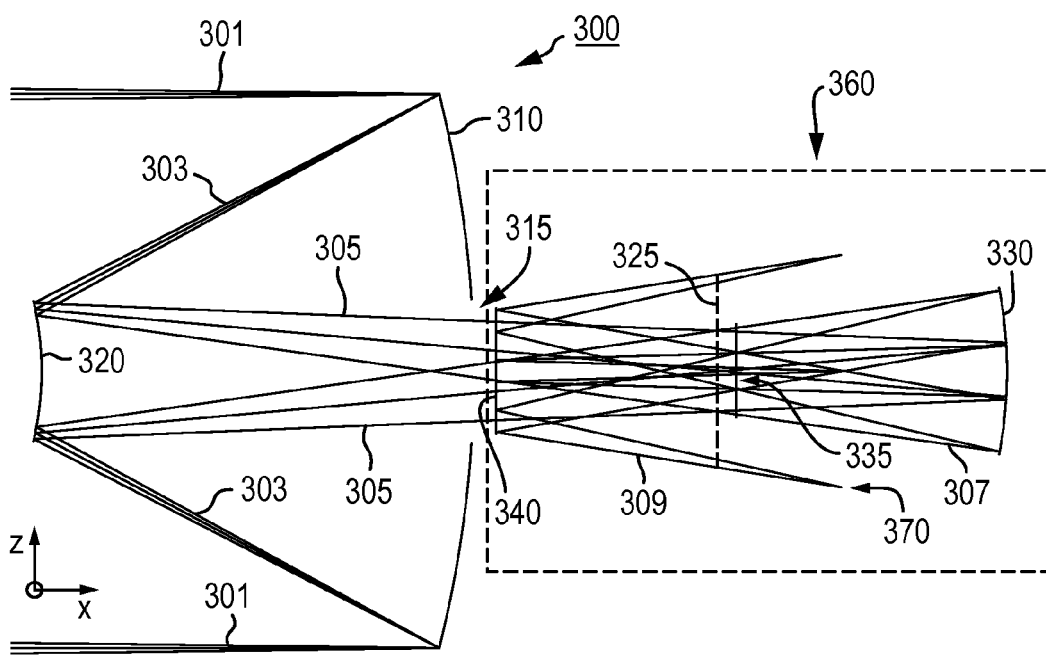

The embodiment in FIGS. 3(a) and (b) depicts a ray-trace section of an all-reflective optical system 300 that is constructed to provide focal optical functions that is derived from the first two mirrors of the afocal three-mirror anastigmat optical system 100 shown in FIGS. 1(a) and (b). FIG. 3(a) shows a side view and FIG. 3(b) shows a top view of optical system 300.

Optical system 300 generally includes primary mirror 310, secondary mirror 320, tertiary mirror 330 and quaternary mirror 340. Incoming light rays 301 impinge on primary mirror 310 which reflects beams 303 onto secondary mirror 320. Light rays 305 may be reflected by secondary mirror 320 through central opening 315 of primary mirror 310 onto tertiary mirror 330 of relay 360.

Tertiary mirror 330 receives divergent light rays 305 from intermediate image 325 by substantially relaying divergent light rays 305 and reflecting light rays 307 onto quaternary mirror 340. Quaternary mirror 340 receives light rays 307 from tertiary mirror 330 and performs further reimaging of light rays 307 and reflects rays 309 to form focal point 370. Quaternary mirror 340 may have very little power and may be used primarily for aberration correction; it may either positively or negatively powered.

The construction of primary mirror 310 and secondary 320 may be similar to primary mirror 110 and secondary mirror of conventional afocal optical system 100. Relay 360 may include tertiary mirror 330 and quaternary mirror 340 to provide focal functions even though primary mirror 310 and secondary mirror 320 are optimal for use in an afocal three-mirror anastigmat optical system.

Both tertiary mirror 330 and quaternary mirror 340 may be high order general aspheric surface beyond those of conical surface (e.g., paraboloid, hyperboloid, or ellipsoid). Tertiary mirror 330 may be a positive-powered aspheric mirror which has a majority of the positive power that is expected in relay 360 and is configured to substantially reimage rays 305 incident thereon. In one implementation, quaternary mirror 340 may be a slightly powered near-flat aspheric mirror which has much less power than tertiary mirror 330, and is configured to further reimage light rays 305 incident thereon. And, in some implementations, tertiary mirror 330 and quaternary mirror 340 having small tilts and de-centers may be used in optical system 300. Intermediate image 325 is formed between secondary mirror 320 and tertiary mirror 330. Intermediate image 325 is essentially the "boundary" of the Cassegrain foreoptics. Reimaged pupil 335 is located between tertiary mirror 330 and quaternary mirror 340 of relay 360.

The structure, parameters, and/or placement of tertiary mirror 330 and quaternary mirror 340 in optical system 300 may be arranged to cause a flat-field condition to be achieved at a desired focal length and off-axis aberrations (notably coma and astigmatism) over a desired field-of-view (FOV) to be corrected. In one embodiment, a majority of the aberrations (e.g., coma, spherical, and astigmatism) are corrected by tertiary mirror 330, and further aberration correction is performed by quaternary mirror 340.

In one embodiment, by utilizing relay 360, as described above, optical system 300 provides focal functions even when the conic or aspheric departures of primary mirror 310 and secondary mirror 320 are optimized for use in an afocal three-mirror anastigmat optical system.

Primary mirror 310, secondary mirror 320, tertiary mirror 330, and quaternary mirror 340 may be designed on a computer with a ray-trace software package. Although the optical arrangement of various embodiments of this disclosure are new, an optical prescription for optical system 300 in FIG. 3 may be generated using an equation which may be an industry standard, and would be known to one of ordinary skill in the art.

One such optical prescription for optical system 300 is shown in FIG. 6 in accordance with an embodiment. As configured, optical system 300 has an F-number of 16 and a field of view of about 1.5 degrees.

From the optical prescription in FIG. 6, it will be appreciated that primary mirror 310 and secondary mirror 320 are mirrors that are optimized for an afocal three-mirror anastigmat telescope. In fact, primary mirror 310 and secondary mirror 320 may be the same configuration as primary mirror 110 and secondary mirror 120 of the conventional afocal optical system 100 (FIG. 1).

In one embodiment, primary mirror 310, secondary mirror 320, tertiary mirror 330, and quaternary mirror 340 share a common optical axis without de-center and tilts. FIG. 6 provides one exemplary set of values for various parameters of tertiary mirror 330 and quaternary mirror 340 which, as depicted in FIG. 3, are located behind primary mirror 310 and secondary mirror 320 to form a high performance image-forming or focal optical system.

Even though the two described prescriptions for optical systems 200 and 300 have the field offsets and FOV for the derived focal optical systems in the same plane (elevation and azimuth, respectively) as the afocal TMA, it will be appreciated that the field offsets and the FOV for the derived focal systems can be in the orthogonal plane (azimuth and elevation, respectively) to the afocal TMA. For this case, the mirrors unique to the derived focal systems will employ x-decenters and x-tilts in addition to y-decenters and y-tilts. If the derived focal is offset in the plane orthogonal to the field offset of the afocal (that is, the x plane), then the x-decenters and x tilts function as would the y-decenters and y-tilts would if the derived focal were offset in the same plane as the field offset of the afocal. This is to preserve bi-lateral symmetry of the system (if it exists).

In certain implementations, the two-mirror focal relay may be a replacement or a substitute for the single-mirror afocal eyepiece of the prior art, and thus changing the prior art afocal optical system into an image forming or focal optical system while using the same first two mirror configuration thereof. In other implementations, the teachings of this application may be used simultaneously with the prior art eyepiece, yielding both an afocal and a focal optical system. Indeed, subject to certain physical and optical interference limitations, one or more focal relays as taught by this invention can be used simultaneously with one or more prior art afocal eyepieces to yield multiple afocal and focal optical system results. Among other ways that this can be accomplished, the choice and use of the unique field offsets for each of these afocal or focal optical systems can avoid such physical and optical interferences.

In other implementations, folding mirrors and/or beam steering mirrors may also be included in the optical systems disclosed herein. Such features are discussed, for example, in U.S. patent application Ser. No. 12/369,976, mentioned above.

Other embodiments, uses and advantages of the inventive concept will be apparent to those skilled in the art from consideration of the above disclosure and the following claims. The specification should be considered non-limiting and exemplary only, and the scope of the inventive concept is accordingly intended to be limited only by the scope of the following claims.

What is claimed is:

1. An optical system, comprising:
a primary mirror of a positive-powered concave substantially paraboloidal configuration configured to reflect light incident thereupon;
a secondary mirror of a negative-powered convex hyperboloidal configuration facing the primary mirror configured to receive the light reflected from the primary mirror and redirect the light reflected from the primary mirror;
a positive-powered tertiary mirror configured to substantially reimage and reflect divergent light rays incident from the secondary mirror; and
a quaternary mirror configured to receive the reimaged light rays from the tertiary mirror, and to relay the received reimaged light rays to a focal point of the optical system to produce a focal point image.

2. The optical system according to claim 1, wherein the primary and secondary minors are configured for use in an afocal optical system.

3. The optical system according to claim 1, wherein the tertiary and quaternary minors provide a relay system.

4. The optical system according to claim 3, wherein the relay system is positioned behind the primary mirror and the secondary minor.

5. The optical system according to claim 1, wherein the positive-powered concave substantially paraboloidal primary mirror tends towards a mild hyperboloid.

6. The optical system according to claim 1, wherein the quaternary minor is positively or negatively powered.

7. The optical system according to claim 1, wherein the quaternary minor is near-flat having lesser power than the tertiary mirror.

8. The optical system according to claim 1, wherein the quaternary minor is configured to correct for aberrations.

9. The optical system according to claim 1, wherein the tertiary mirror and quaternary minor each have higher order aspheric surface departures.

10. The optical system according to claim 1, wherein the primary minor, the secondary mirror, the tertiary mirror and the quaternary mirror share a common optical axis without a de-center and a tilt.

11. The optical system according to claim 1, wherein the tertiary mirror has (i) a x de-center and a x-tilt, (ii) a y de-center and a y-tilt, or (iii) both.

12. The optical system according to claim 1, wherein if the secondary minor has (i) a x de-center and a x-tilt, (ii) a y de-center and a y-tilt, or (iii) both, then the tertiary mirror has a corresponding (i) x de-center and x-tilt, (ii) y de-center and y-tilt, or (iii) both.

13. A method comprising:
reflecting, using a primary mirror of a concave substantially paraboloidal configuration, light rays incident thereon;
reflecting, using a secondary minor of a convex hyperboloidal configuration facing the primary mirror, the light rays received from the primary mirror;
substantially reimaging and reflecting, using a positive-powered tertiary mirror, divergent light rays incident from the secondary mirror; and
reflecting and focusing, using a powered quaternary minor, the reimaged light rays incident from the tertiary mirror to a focal point to form a focal point image.

14. The method according to claim 13, wherein the primary and secondary minors are configured for use in an afocal optical system.

15. A method of producing a focal optical telescope comprising:
providing a primary minor of a concave substantially paraboloidal configuration for reflecting light rays incident thereon;
providing a secondary mirror of a convex hyperboloidal configuration for reflecting the light rays received from the primary minor;
providing a positive-powered tertiary mirror for substantially reimaging and reflecting divergent light rays incident from the secondary mirror; and
providing a powered quaternary minor for reflecting and focusing the reimaged light rays incident from the tertiary mirror to a focal point of the focal optical telescope.

16. The method according to claim 15, wherein the primary and secondary minors are configured for use in an afocal optical system.

17. The method according to claim 15, wherein providing the tertiary and quaternary minors comprises substituting a relay comprising the tertiary and quaternary mirrors for an eyepiece comprising a positive-powered aspheric minor that is configured to substantially collimate and reflect light rays incident thereon forming an exit pupil of the eyepiece.

* * * * *

UNITED STATES PATENT AND TRADEMARK OFFICE
CERTIFICATE OF CORRECTION

PATENT NO. : 8,427,744 B2
APPLICATION NO. : 12/577279
DATED : April 23, 2013
INVENTOR(S) : Lacy G. Cook It is certified that error appears in the above-identified patent and that said Letters Patent is hereby corrected as shown below:

In the Claims

In claim 2, column 7, line 66, "minors" should be replaced with --mirrors--.

In claim 3, column 8, line 2, "minors" should be replaced with --mirrors--.

In claim 4, column 8, line 4, "minor" should be replaced with --mirror--.

In claim 6, column 8, line 10, "minor" should be replaced with --mirror--.

In claim 7, column 8, line 12, "minor" should be replaced with --mirror--.

In claim 8, column 8, line 15, "minor" should be replaced with --mirror--.

In claim 9, column 8, line 17, "minor" should be replaced with --mirror--.

In claim 10, column 8, line 20, "minor" should be replaced with --mirror--.

In claim 12, column 8, line 27, "minor" should be replaced with --mirror--.

In claim 13, column 8, line 35, "minor" should be replaced with --mirror--.

In claim 13, column 8, line 41, "minor" should be replaced with --mirror--.

In claim 14, column 8, line 45, "minors" should be replaced with --mirrors--.

In claim 15, column 8, line 49, "minor" should be replaced with --mirror--.

In claim 15, column 8, line 54, "minor" should be replaced with --mirror--.

In claim 15, column 8, line 58, "minor" should be replaced with --mirror--.

In claim 16, column 8, line 62, "minors" should be replaced with --mirrors--.

Signed and Sealed this
Twenty-third Day of July, 2013

Teresa Stanek Rea
*Acting Director of the United States Patent and Trademark Office*

CERTIFICATE OF CORRECTION (continued)
U.S. Pat. No. 8,427,744 B2

In claim 17, column 8, line 65, "minors" should be replaced with --mirrors--.

In claim 17, column 8, line 67, "minor" should be replaced with --mirror--.